3,284,849
APPARATUS FOR THE CONTINUOUS IMPREGNATION AND FORMING OF TUBING
Curtis U. Coleman, Cranston, R.I., and George E. Davis, Hatboro, and James P. Malloy, Cheltenham, Pa., assignors to The Electric Storage Battery Company, a corporation of New Jersey
Filed Mar. 26, 1963, Ser. No. 268,067
8 Claims. (Cl. 18—4)

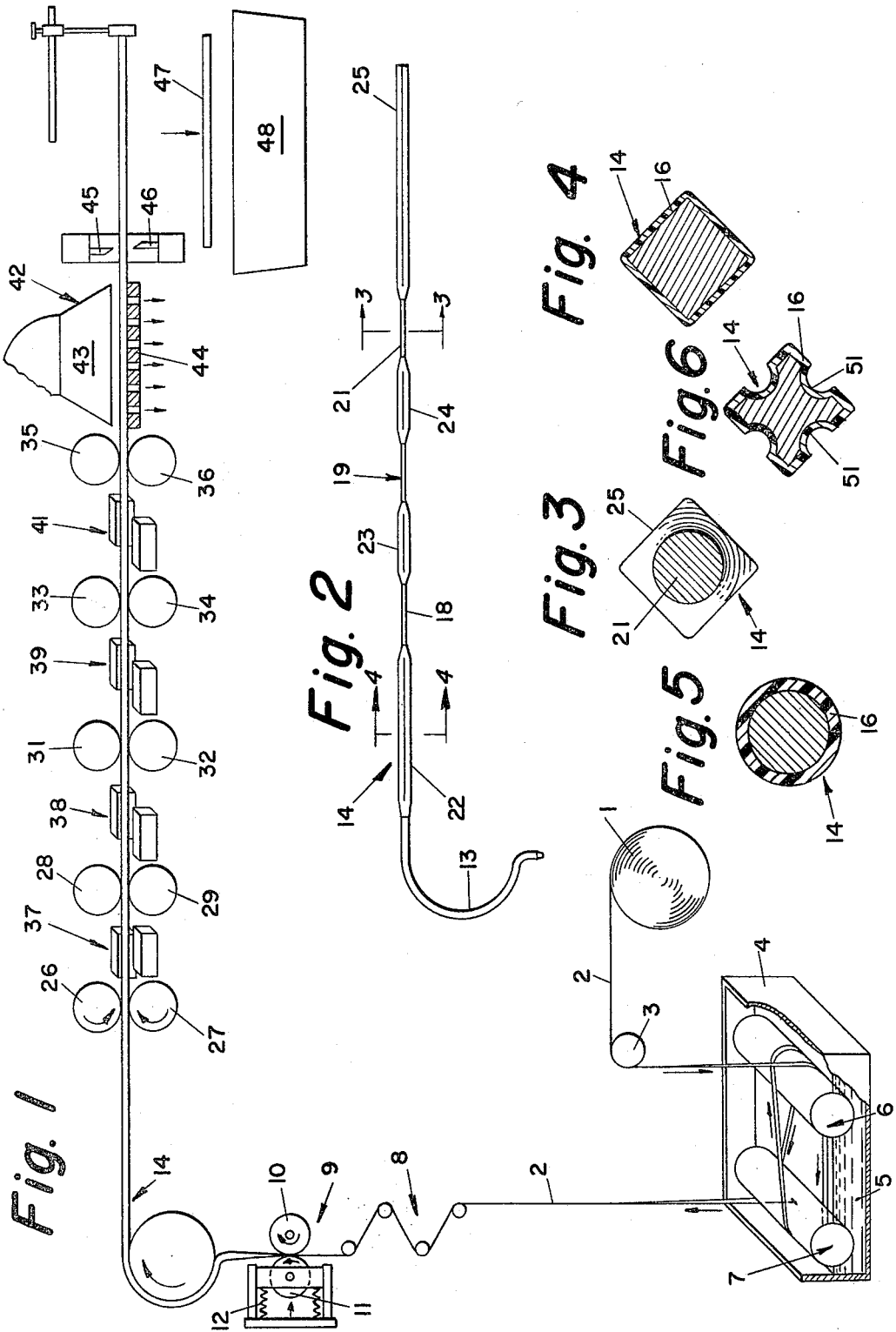

The present invention generally relates to a machine for continuously manufacturing resin impregnated fabric base tubing.

While not limited thereto, the machine of present invention is particularly adapted for the continuous production of active material retaining tubes of the type utilized in lead-acid storage batteries wherein spaced pencils of active material are mounted on metal spines which extend between top and bottoms bars and which are surrounded with an insulating sheath or tube adapted to secure the active material to the individual spines. For this purpose tubing is often woven, knitted, or braided of glass or synthetic resin fibers and stiffened by impregnation with a suitable resinous material. When synthetic resin fibers are utilized to make such tubing, it is desirable to use a stiffening resin which will enhance the resistance of the fibers to corrosion. Similarly, when glass fibers are utilized it has been found desirable to impregnate the tubing with a resin which in addition to stiffening the fabric, will also protect the individual fibers and filaments of the fibers from abrasion, in order to achieve the mechanical strength inherent in that material.

It is an object of the present invention to provide a machine for continuously and automatically impregnating fabric tubing with resin, shaping the tubing, setting or curing the resin, and cutting the tubing to the desired length.

It is another object of the present invention to provide a machine which while impregnating and stiffening glass fabric tubing will also coat the individual filaments of which the fibers of the glass fabric tubing are made.

In accordance with the present invention, knitted, woven, or braided collapsed fabric tubing of fiber glass or a suitable synthetic resin fiber such as Dynel or Dacron, is continuously impregnated with a solution or dispersion of a chemically resistant thermoplastic or thermosetting resin by passing it through an impregnating solution. Following the impregnation, the tubing is wiped and rolled under a controlled pressure to regulate the amount of resin retained by the fabric and to distribute the resin uniformly therethrough. The undried coated tubing is then carried onto and along a stationary mandrel on which the impregnating resin is polymerized or cured and the tubing shaped and stiffened. To this end, the mandrel is mounted adjacent to appropriate heating means which raises the temperature of the impregnated tubing as it progresses along the mandrel. As the resin reaches the point of incipient cure, the contour of the mandrel changes to the shape that is desired for the finished tubing. To this end, the heating temperatures utilized and the dwell time of the tubing on the mandrel are selected to impart to the tubing the desired rigidity as controlled by the curing time and temperature required by the impregnating resin. After leaving the mandrel the impregnated tubing is cooled to complete the hardening of the resin and the tubing cut to the desired length to continuously produce tubing suitable for storage battery purposes.

Further in accordance with the present invention the rapid continuous curing of the impregnated fabric tubing is accomplished by the utilization of the unique mandrel configuration and cooperating driving means which engages the tubing on the mandrel and moves it therealong at controlled speeds. Specifically the mandrel is provided with alternate areas of square cross-section and reduced cross-section and terminates in a sizing section having the cross-sectional configuration desired of the finished tubing. With the exception of the feed drive and the driving means engaging the tubing at the sizing section the tube driving means engages the tubing on the mandrel at the areas of square cross-section. To facilitate the curing of the resin and to prevent the tubing from sticking to the mandrel as the resin approaches cure, the tubing is heated at the areas of reduced cross-section. In order to insure that the finished tubing has a uniform cross-section the tubing is driven along the mandrel at the curing section at a slightly higher speed than it is driven at the earlier stages of mandrel travel. This causes it to be drawn tightly against the mandrel and to conform to the configuration of the sizing section.

A better understanding of the present invention may be had from the following detailed description thereof when read with reference to the accompanying drawings of which:

FIG. 1 is a schematic showing of a machine for carrying out the method of the present invention in a continuous process;

FIG. 2 is an elevational view of the mandrel utilized in the machine of FIG. 1;

FIG. 3 is a cross-sectional view of the mandrel of FIG. 2 taken along the lines 3—3 of that figure;

FIG. 4 is a cross-sectional view of the mandrel of FIG. 2 taken along the lines 4—4 of that figure;

FIG. 5 is a cross-sectional view of the sizing section of a mandrel for producing tubing having a round cross-section; and FIG. 6 is a cross-sectional view of a modification of the sizing section of a mandrel for producing tubing having a square cross-section.

Referring to FIG. 1, the numeral 1 designates a roll of fabric tubing 2 which may be either woven, knitted, or braided to form a substantially continuous tube in a collapsed unrigid form. While for the purposes of illustration the tubing 2 has been shown as collected on a feed roll 1, it should be understood that other types of feed may be employed. For example, the collapsed tube may be loosely coiled into a suitable container or bin and fed therefrom. From the roll 1 the tubing 2 is passed over a roller 3 into an impregnating tank 4 containing a solution 5 of the resin with which it is to be impregnated. By way of example, the impregnating resin 5 may be a thermosetting resin such as phenol formaldehyde dispersed in a solution of ethanol.

The amount of resin picked up by the tubing 2 is a fnuction of the dwell time of the tubing in the impregnating solution 5. To control the dwell time of the tubing 2 in the impregnated solution 5 the impregnating tank 4 is provided with a pair of rollers 6 and 7 over which the tubing may be passed one or more times. The dwell time of the tubing 2 in the impregnating solution 5 can be increased or decreased by increasing or decreasing the number of passes made by the tubing 2 between the rollers 6 and 7. Where the direction of travel of the tubing 2 through the impregnating solution 5 requires it, the rollers 6 and 7 may be replaced by a series of individual rollers designed to rotate independently of one another. In the case of tubing of fiber glass where it is desirable to coat the individual monofilaments of glass which comprises the thread of which the tubing is formed, in order to prevent abrasion between continguous monofilaments, it has been found desirable to pass the tubing at least five times through the resin solutions. For a machine producing tubing at the rate of 30 feet per minute, a minimum dwell time in the solution of approximately fifteen seconds has been found to be desirable.

Following the bath in the impregnating solution 5, the tubing 2 passes through a wiping operation which comprises drawing it through a series of staggered wiping bars 8 which wipes excess resin from the impregnated material. This wiping operation is designed to remove the excess resin from the surface of the fabric and in addition, forces the resin between and into the threads so that the fibers comprising the threads become coated. Following the wiping operation, the tubing 2 is passed between feed drive means which may be pressure rollers 9 which are power driven by suitable means, not shown, to pull the tubing 2 from the roll 1 through the impregnating solution 5 and past the wiping rollers 8. The surface of the pressure rollers 9 may be knurled steel to increase the traction between the rollers and the tubing. The pressure on the rollers 9 is selected to squeeze the excess resin from the fabric in order that the pores thereof are not blocked by the resin and to work the resin into the threads and around the filaments of which the threads are formed. Depending upon the weight and structure of the woven fabric comprising the tubing and the resin used, one or more passes around the pressure rollers 9 may be necessary to effectively perform the squeezing operation described and to achieve the traction necessary to pull the fabric through the preceding stages. For the purpose of illustration, the pressure rollers 9 have been shown here as a stationary driving roller 10 and a mating spring loaded driving roller 11 which bears against the roller 10. The pressure between the rollers 9 may be governed by the controlling of the compression of the spring 12 which urges the roller 11 against the stationary roller 10.

Following the wiping and squeezing operation the impregnated collapsed tubing is fed onto a mandrel 14 for the shaping, curing, and sizing operation. As used herein the term "curing" should be understood to include other processes such as polymerization and setting wherein the physical characteristics of a resinous-like material are changed by heat from those of a liquid to those of a solid whether it be through cross-linking, polymerization, or the removal of a solvent. The mandrel 14, one form of which is shown in detail in FIGS. 2–4, is a floating mandrel having a crooked end 13 adapted to fit over and engage a feed drive means which may be a wheel 15 which is shaped to the contour of the crook 13. The speed of the mandrel feed drive wheel 15 controls the rate of speed and bunching of the tubing 2 as it passes onto the mandrel 14. To this end it has been found desirable to have the pressure rollers 9 and the mandrel feed drive wheel 15 drive the tubing 2 at a speed slightly in excess of the speed of tubing 2 on the mandrel so that the tubing 2 tends to bunch at the feed end of the mandrel thereby causing the collpased ribbon of tubing to open and flow more freely onto the mandrel. The cross-sectional configuration of mandrel 14 at the crook 13 is not critical; however, since a knitted, woven or braided tube tends naturally to form a circular tube when opened, the input end of the mandrel 14 has a circular cross-section to provide a more natural transition between the flat ribbon and the square cross-section utilized on farther along the mandrel. The mandrel 14 is coated with a suitable protective material 16 such as a ceramic or a plastic such as tetrafluorethylene or the like to which the impregnated tubing will not readily adhere.

As best illustrated in FIGS. 2–4, the cross-section of the mandrel 14 changes as the tubing 2 progresses from the feed end at the crook 13 to the discharge end. Thus, there is provided a plurality of areas of reduced cross-section 18, 19, and 21 between a plurality of areas of square cross-sections 22, 23, and 24. The discharge end or sizing section 25 of the mandrel 14 beyond the reduced section 21 has the configuration desired for the finished tubing. The mandrel as illustrated in FIGS. 3 and 4 is designed to produce tubing of a square cross-section, and accordingly, the sizing section 25 has a square cross-section. Prior to reaching the sizing section 25, the tubing 2 is moved along the mandrel 14 by a plurality of driving means which engage the tubing at the areas 22, 23, and 24 of the mandrel having square cross-sections. The utilization of a square cross-section in the areas 22, 23, and 24 of the mandrel has been found to prevent the tubing 2 from twisting on and seizing the mandrel as it moves over the mandrel. Thus, regardless of the cross-sectional configuration of the sizing section 25 of the mandrel 14, the areas 22, 23, and 24 have square cross-sections. As shown, the driving means comprises pairs of oppositely disposed driving rollers 26 and 27, 28 and 29, and 31 and 32, which engage the tubing 2 on the mandrel at the areas 22, 23, and 24 respectively.

In accordance with the present invention the temperature of the resin impregnated tubing is increased as the tubing progresses along the mandrel. The heating of the tubing is accomplished by heating means 37, 38, 39, and 41 placed adjacent to the path of travel of the mandrel at the areas of reduced cross-section 18 to 21 and at the sizing section 25 where the tubing is set to its final shape. The utilization of areas of reduced cross-section adjacent to the heater means permits a more rapid heating of the tubing and, in addition, reduces the drag of the fabric on the mandrel as the resin approaches cure. The heating means 37 through 41 may be infrared lamps, hot air or any other convenient form of heating. The heating operation is performed in steps, the first step being operative to drive off the solvent or solution in which the impregnating resin is dissolved or dispersed the latter stages of heating being operable to effect the actual cure of the impregnating resin. The temperature of the various heating zones may be independently controlled according to the amount of cure to be accomplished at each area of the mandrel.

As the tubing progresses along the mandrel 14 the resin becomes progressively tacky as it undergoes the chemical transformation associated with polymerization or core. The speed of passage of the tubing 2 along the mandrel 14 and the temperature of the heating elements is controlled so that as the tubing reaches the sizing section 25 the resin will have reached the point of incipient cure. In this respect it is necssary that the impregnating resin be set only when the final contour is achieved and not before so that the bonds between adjacent threads are not complete. To this end it has been found desirable to have the fabric only surface dried as it enters the sizing section 25 of the mandrel 14.

To assure the conformance of the tubing 2 to the sizing section 25 the driving means or rollers 33, 34, 35, and 36 engaging the tubing at the sizing section 25 are driven at a slightly higher speed than the driving rollers engaging the tubing in the areas 22, 23, and 24 so as to draw the tubing tightly to the contour of the sizing section 25. This assures conformity of the tubing to the configuration of the sizing section 25 and thus, uniformity of product. To this end, the driving rollers 33, 34, 35, and 36 are synchronized independently of the other driving rollers. The final setting of the impregnating resin is accomplished by the heating means 41 which are adjacent to the sizing section 25 of the mandrel 14. As noted, there is no area of reduced cross-section at the sizing section 25 and it is that desired of the final tubing.

The surface of the driving rollers 26 through 36 may be knurled or rubber faced in order to get a greater traction between the tubing 2 and the driving rolls.

As the tubing 2 passes beneath the driving rollers 35 and 36 the mandrel comes to an end and the tubing which is semi-rigid has the shape of the mandrel sizing section. The tubing then passes through a cooling zone generally designated as 42 in which its temperature is reduced to increase its rigidity. As shown, the cooling may be accomplished by passing the tubing through a stream of cool air from a blower 43 while the tubing is supported on a perforated retaining track 44. The rigid tubing is then passed through a cutting device which is shown diagrammatically as a pair of shearing knives 45 and 46 which are synchronized with the speed of the moving tubing to cut it into predetermined lengths. While the cutting means has been illustrated as the shearing knives 45 and 46 it should be understood that other cutting means may be employed. For example, a driven sawing member synchronized to move longitudinally with the tubing as it progresses from the cooling zone may be utilized to reduce damage to the ends of the cut tubes. As cut, the stiffened tubes 47 may be collected in a suitable bin 48. Where a phenolic resin has been used to impregnate the tubing it may be desirable to further stiffen the cut tubes by a post cure in an oven during which the phenolic resin would be carried to its "C" stage.

As stated hereinbefore the apparatus of the present invention is operable to produce tubing having other than a square cross-section. To produce tubing having other configurations, the sizing section 25 of the mandrel 14 would have the cross-section of that desired of the finished tubing with the other portions of the mandrel remaining as previously described. Referring now to FIG. 5 there is shown a cross-section of the sizing section 25 of a mandrel which is designed to produce tubing having a round cross-section. As shown, the sizing section 25 for this mandrel has a round cross-section. Obviously other tubing configurations can be produced by similarly modifying the sizing section 25 of the mandrel.

In order to reduce the drag of the tubing as it passes over the mandrel and thereby to reduce the wear on the mandrel coating, modifications may be made in the cross-sectional configuration of the mandrel. One such modification is illustrated in FIG. 6 as applied to a mandrel for producing tubing having a square cross-section, but the concepts of this modification may be applied to mandrels for producing other types of tubing. Referring specifically to FIG. 6 there is shown the cross-section of a mandrel having longitudinal grooves 51 in its parallel sides which reduces the area of the mandrel contacted by the tubing. As long as the cross-section of the tubing to be produced is not large a sizing section 25 of the mandrel having this configuration presents a square cross-section to the tubing.

From the foregoing, it can be seen that the machine of the present invention provides a new and improved means for continuously producing fabric tubing which is impregnated and stiffened by a polymerizable resin. In addition, the machine described provides an apparatus which will, in addition to coating the individual threads of a fabric tubing, also coat the individual fibers or filaments which comprise the threads of the tubing. The utilization of the mandrel configurations described and the cooperating driving means in combination with the heating means not only facilitates the curing of the impregnating resin, but insures a continuous, rapid production of a uniform product. As will be understood by those skilled in the art, certain modifications may be made in the embodiments of the present invention described without departing from the spirit of the invention as described in the appended claims.

Having described the present invention, that which is claimed as new is:

1. An apparatus for producing heat cured resin impregnated fabric tubing comprising, in combination, means for impregnating the tubing with the heat curable resin, a stationary mandrel having areas of reduced cross-section and an area with the cross-section desired in the impregnated tubing, feed drive means situated between the impregnating means and the mandrel and being adapted to place the impregnated tube on the mandrel, first driving means adapted to feed the tubing along the mandrel, first heating means adjacent to the mandrel at the areas of reduced cross-section, second driving means adapted to draw the tubing to that area of the mandrel having the cross-section desired in the impregnated tubing, and second heating means situated adjacent the portion of the mandrel having the cross-section desired in the impregnated tubing.

2. Apparatus as specified in claim 1 including cooling means for cooling the tubing as it comes from the mandrel and cutting means for cutting the tubing to the desired length.

3. An apparatus for producing heat cured resin impregnated fabric tubing comprising, in combination, an impregnating tank containing a solution of a heat curable resin for impregnating the tubing, means for passing the tubing to be impregnated through the solution, means for removing any excess solution from the tubing, a stationary mandrel having areas of reduced cross-section and an area with the cross-section desired in the impregnated tubing, feed drive means situated between the impregnating tank and the mandrel and being adapted to place the impregnated tube on the mandrel, first driving means adapted to feed the tubing along the mandrel, first heating means adjacent to the mandrel at the areas of reduced cross-section, second driving means adapted to draw the tubing to that area of the mandrel having the cross-section desired in the impregnated tubing, and second heating means situated adjacent the portion of the mandrel having the cross-section desired in the impregnated tubing.

4. Apparatus as specified in claim 3 including cooling means for cooling the tubing as it comes from the mandrel and cutting means for cutting the tubing to the desired length.

5. An apparatus for producing heat cured resin impregnated fabric tubing comprising, in combination, means for impregnating the tubing with the heat curable resin, means for removing excess resin from the tubing, means for pressing the remaining resin into the fabric of the tubing, a stationary mandrel having areas of reduced cross-section and an area with the cross-section desired in the impregnated tubing, feed drive means situated between the impregnating means and the mandrel and being adapted to place the impregnated tube on the mandrel, first driving means adapted to feed the tubing along the mandrel, first heating means adjacent to the mandrel at the areas of reduced cross-section, second driving means adapted to draw the tubing to that area of the mandrel having the cross-section desired in the impregnated tubing and being adapted to move the tubing along the mandrel at a rate faster than the first driving means, and second heating means situated adjacent the portion of the mandrel having the cross-section desired in the impregnated tubing.

6. Apparatus as specified in claim 5 including cooling means for cooling the tubing as it comes from the mandrel and cutting means for cutting the tubing to the desired length.

7. An apparatus for producing heat cured resin impregnated fabric tubing comprising, in combination, an impregnating tank containing a solution of the resin with which the tubing is to be impregnated, means for passing the tubing to be impregnated through the solution, means for removing any excess solution from the tubing, means for pressing the resin into the fabric of the tubing, a stationary mandrel having areas of reduced cross-section and an area with the cross-section desired in the impregnated tubing, feed drive means situated between the impregnating tank and the mandrel and being adapted to place the impregnated tube on the mandrel, first driving means adapted to feed the tubing along the mandrel, first heating means adjacent to the mandrel at the areas of reduced cross-section, second driving means adapted to draw the tubing to that area of the mandrel having the cross-section desired in the impregnated tubing, and second heating means situated adjacent the portion of the mandrel having the cross-section desired in the impregnated tubing.

8. Apparatus as specified in claim 7 including cooling means for cooling the tubing as it comes from the mandrel and cutting means for cutting the tubing to the desired length.

References Cited by the Examiner

UNITED STATES PATENTS

| | | |
|---|---|---|
| 2,990,091 | 6/1961 | Goldsworthy et al. |
| 3,151,354 | 11/1964 | Boggs _____ 18—4 |
| 3,185,603 | 5/1965 | Boggs. |
| 3,235,429 | 2/1966 | Boggs. |

WILLIAM J. STEPHENSON, *Primary Examiner.*

J. SPENCER OVERHOLSER, *Examiner.*